United States Patent [19]

Taylor, Jr.

[11] Patent Number: 4,569,424
[45] Date of Patent: Feb. 11, 1986

[54] BRAKE SHOE CONSTRUCTION

[76] Inventor: James L. Taylor, Jr., 1611 S. Renaud, Grosse Pointe Woods, Mich. 48236

[21] Appl. No.: 574,577

[22] Filed: Jan. 27, 1984

[51] Int. Cl.⁴ .............................................. F16D 69/04
[52] U.S. Cl. ................................................ 188/250 G
[58] Field of Search ............. 188/73.1, 250 B, 250 G, 188/261; 192/107 R, 107 T

[56] References Cited

U.S. PATENT DOCUMENTS

| | | | |
|---|---|---|---|
| 1,532,141 | 4/1925 | Kenyon | 188/250 G X |
| 1,781,074 | 11/1930 | Norton | 188/250 G X |
| 1,872,850 | 8/1932 | Trainer . | |
| 1,880,750 | 10/1932 | Brackett . | |
| 1,925,363 | 9/1933 | Apple | 188/250 G |
| 1,927,252 | 9/1933 | Winters . | |
| 1,937,140 | 11/1933 | Blume . | |
| 1,950,260 | 3/1934 | Nelson | 188/250 G X |
| 1,974,561 | 9/1934 | Cunningham | 188/250 G X |
| 2,650,022 | 10/1953 | McCune . | |
| 2,948,361 | 8/1960 | Pogue . | |

*Primary Examiner*—Duane A. Reger
*Attorney, Agent, or Firm*—Harness, Dickey & Pierce

[57] ABSTRACT

An improved brake shoe assembly is provided wherein friction material is cast directly onto a brake liner plate. The brake liner includes a plurality of perforations which form protruding tabs. Interengagement between the cast friction material and the perforated areas and tabs provides excellent interlocking strength between these components. The number, size, orientation and configuration of these tabs may be selected with regard to the specific operating characteristics to which the brake shoe assembly is to be employed.

7 Claims, 8 Drawing Figures

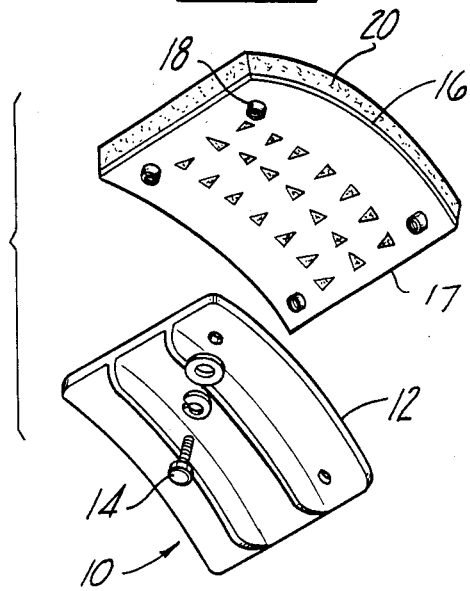
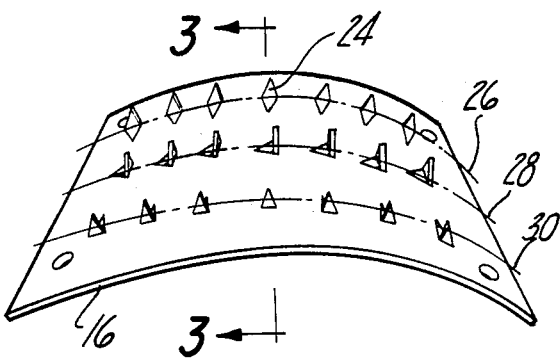
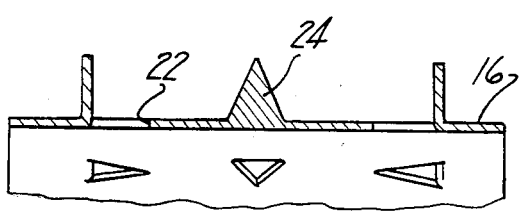
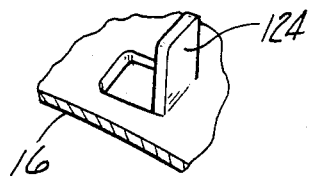
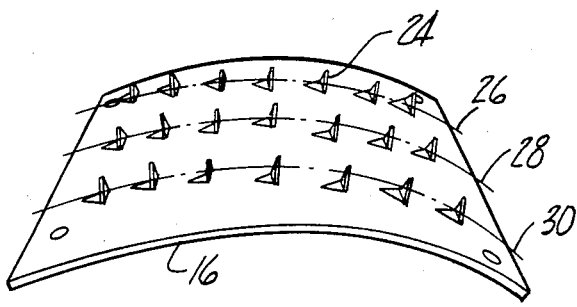
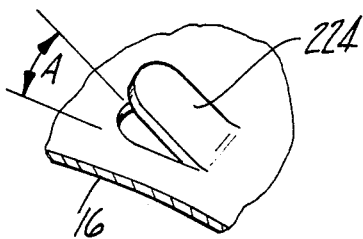
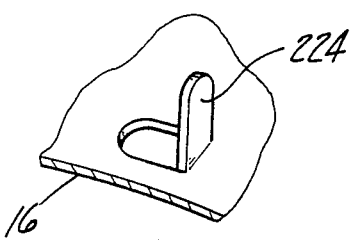

BRAKE SHOE CONSTRUCTION

BACKGROUND AND SUMMARY OF THE INVENTION

This invention relates to a friction brake shoe assembly and method of producing same, and more particularly, to a brake shoe assembly usable for motor vehicles which includes a perforated metal backing plate having raised tabs onto which friction material is cast.

Drum type friction brakes include brake shoe assemblies which are typically urged into contact with an inner cylindrical surface of a rotating brake drum by a hydraulic actuating cylinder. Various approaches to attaching the friction material, typically asbestos based, to the metal shoe or to a separate backing plate have been previously employed or proposed. Generally speaking, two major types of fastening system are currently employed. In one type of system, a pre-formed segment of friction material is bonded by adhesives to the metal brake shoe or to a backing plate which becomes attached to the brake shoe by mechanical fasteners. Another major type employs mechanical fasteners such as deformable rivets which are placed at a plurality of locations on the surface of the friction material and engage bores in the associated brake shoe or backing plate, thereby fastening these parts together. Irrespective of which of the above systems are selected for manufacturing a brake shoe assembly, it is necessary to separately form a segment of friction material and thereafter attach it to a supporting structure.

In view of the above, it is a principal aspect of this invention to provide a brake shoe assembly which may be produced at lower cost as compared to currently available brake shoe assemblies. It is another aspect of this invention to provide a brake shoe assembly featuring excellent mechanical engagement between the friction material and the brake shoe.

The above principal aspects of this invention are provided by an assembly constructed by a process involving casting friction material directly onto a metal brake shoe or to a backing plate which includes a plurality of perforations and raised tabs which cause an interlocking engagement to occur between the friction material and the supporting structure. In accordance with the teachings of this invention, the perforations and raised tabs are formed by cutting a portion of the brake shoe or backing plate and bending a tab portion formed within the area of the cut.

Casted brake shoe assemblies have been previously proposed and a list of such references teaching such techniques are listed below.

| U.S. PAT. NO. | INVENTOR | DATE |
| --- | --- | --- |
| 1,880,750 | T. F. Brackett | October 4, 1932 |
| 1,937,140 | W. A. Blume | November 28, 1933 |
| 1,927,252 | W. H. Winters | September 19, 1933 |
| 2,650,022 | J. C. McCune | October 20, 1953 |
| 1,872,850 | M. N. Trainer | August 23, 1932 |
| 2,948,361 | R. B. Pogue | August 9, 1960 |

These references, however, do not teach the novel aspects of the brake shoe assembly and method according to this invention.

Additional benefits and advantages of the present invention will become apparent to those skilled in the art to which this invention relates upon a reading of the described preferred embodiments of this invention taken in conjunction with the accompanying drawings.

BRIEF DESCRIPTION OF THE DRAWINGS

FIG. 1 is a pictorial exploded view of a brake shoe assembly illustrating a first embodiment of this invention;

FIG. 2 is a pictorial view of the backing plate according to the first embodiment of this invention;

FIG. 3 is a cross-sectional view taken along FIG. 3—3 of FIG. 2;

FIG. 4 is a cross-sectional view illustrating the engagement between the cast-on friction material within the perforations and deflected tabs formed by the backing plate;

FIG. 5 illustrates a second embodiment according to this invention wherein each of the deflected tabs are oriented in the same direction;

FIG. 6 illustrates a third embodiment of this invention illustrating a substantially square-shaped deflected tab;

FIG. 7 illustrates a fourth embodiment according to this invention wherein the projecting tab includes a rounded end configuration; and FIG. 8 illustrates a fifth embodiment wherein the angle between the backing plate and tab is approximately 45 degrees.

DETAILED DESCRIPTION OF THE INVENTION

A brake shoe assembly in accordance with the teachings of this invention is shown by FIG. 1 and is generally designed by reference character 10. Brake lining 17 is composed of backing plate 16 to which a layer of friction material 20 is cast. Brake shoe assembly 10, which is typically actuated into contact with a rotating brake drum by a hydraulic cylinder actuator, is constructed by attaching brake shoe 12 to brake lining 17 by threaded fastener 14. Backing plate 16 includes a plurality of protruding threaded bosses 18 which engage fasteners 14. As is evident from FIG. 4, friction material 20 is cast onto backing plate 16 such that material flows within perforations 22 formed therein. Preferably, a sufficient quantity of friction material 20 is applied under pressure within a forming mold such that the material is caused to flow into perforations 22, and upon solidification, tightly engages backing plate 16. Perforations 22 are formed by cutting backing plate in a manner that a curved cut is formed. The ends of the cut are not joined such that no material becomes separated from the backing plate. Projecting tabs 24 are formed by bending the material within the cut in a radially outward direction with respect to the center of rotation of the associated wheel.

Perforations 22 and tabs 24 may be oriented in various patterns. For example, with reference to FIG. 2, three distinct circumferential lines 26, 28 and 30 are formed by tabs 24. The outermost perforations 22 and tabs 24 are oriented such that they are directed in a direction toward a center circumferential line. The orientation of tabs 24 with respect to brake shoe 12 influences the integrity of the bond between the friction material 20 and backing plate 16. Tabs 24 along central circumferential line 28 are oriented such that they extend in a direction transverse to the circumferential direction of line 28, thereby strongly resisting movement of friction material 20 relative to backing plate 16 due to external loads exerted in the direction of that line. Likewise, tabs 24 along lines 26 and 30 strongly resist displacement of friction material 20 in a direction transverse to the circumferential lines. Another orientation for tabs 24 is illustrated by FIG. 5 wherein, as described in connection with the first embodiment, tabs are directed along three circumferential lines, 26, 28 and 30. However, the second embodiment illustrates each of the tabs being directed in the same direction. Such configuration would provide enhanced strength when the friction material 20 is loaded primarily in a circumferential direction. Since forces exerted on friction material 20 are normally exerted in a circumferential direction by a rotating brake drum, the embodiment illustrated by FIG. 5 would likely be preferred for most applications.

Tabs 24 are formed by cutting backing plate 16 along three sides of a square or rectangle and bending along the fourth side. Other shapes for the tabs formed within brake lining base 16 are also possible. A third embodiment of this invention is shown by FIG. 6 in which tabs 124 have a substantially square or rectangular shape. Such configuration for tabs 124 provide a somewhat greater area of engagement between friction material 20 and backing plate 16. An additional embodiment is shown by FIG. 7 wherein tab 224 are provided having a rounded terminal end. Such configuration has advantages over the first embodiments in that the perforation formed has fewer sharp corners from which fatigue fractures could emanate. Tabs 224 are formed by cutting backing plate 16 along a pair of parallel lines connected at one end by a curved line, and bending along a line connecting the two parallel lines. The embodiments depicted by FIGS. 6 and 7 are subject to the same selective orientation as was explained with regard to the first two embodiments.

A fifth embodiment of this invention is shown by FIG. 8, and varies from the above-described embodiments in that the angle formed by tab 24 with respect to backing plate 16 is approximately 45 degrees as compared to 90 degrees of the previous embodiments. This angle is identified as angle "A" in FIG. 8. By decreasing angle A, the service life of the brake shoe assembly can be increased, since the tabs protrude a smaller distance in a radial direction into friction material 20, as compared to the first through fourth embodiments. Angle "A" must, however, be sufficiently great to permit free flow of friction material 20 into perforation 22 during the casting process.

While the perimeter shape of tabs 24, 124 and 224 differ, they are each substantially planer in shape and each are formed by bending along a straight line. Such configuration features simplify the tooling and cost thereof as compared to designs requiring complex forming operations.

During production, tabs 24 are formed first by cutting backing plate 16. The stock within the cut portion is next deflected along a straight break line to form protruding tabs 24. Alternatively, the process of cutting and bending tabs 24 could be performed in one step using a single tool. Upon completion of processing of backing plate 16, the plate is loaded into a casting apparatus wherein a layer of friction material 20 is deposited in a fluid or semi-fluid state and thereafter cures to a solid state. As a final manufacturing step, the completed assembly would likely be arced or ground such that the outer cylindrical surface is properly shaped.

While the above description specifies an assembly and method involving a brake shoe assembly 10 employing a separate backing plate 16, processes and assemblies wherein perforations 22 and tabs 24 are formed within brake shoe 12 are equally within the scope of this invention.

While the above description constitutes the preferred embodiments of the present invention, it will be appreciated that the invention is susceptible to modification, variation and change without departing from the proper scope and fair meaning of the accompanying claims.

I claim:

1. A replaceable brake lining adapted to be affixed to a brake shoe and adapted to receive cast-on friction material comprising, a rigid brake backing plate defining a portion of a cylinder, said backing plate forming a plurality of protruding tabs oriented along at least three circumferential lines which are spaces with respect to the axis of said cylinder, said protruding tabs formed by cutting along a curved line and deflecting said tabs along a bending line joining the ends of said curved lines, wherein said tabs oriented along at least one of said circumferential lines have a bending line parallel to said axis of said cylinder, and said tabs oriented along at least one of said circumferential lines having a bending line tangent to one of said circumferential lines whereby said cast-on friction material surrounds said protruding tabs and enters the apertures formed by said tabs to interlockingly engage with said backing plate.

2. A brake lining according to claim 1 wherein said backing plate has protruding tabs oriented along a pair of separated outer circumferential lines and a central circumferential line therebetween, said tabs along said central circumferential line having a bending line parallel to said axis and said tabs along said outer circumferential lines having bending lines tangent to said outer circumferential lines.

3. A brake lining according to claim 1 wherein said cuts are shaped in the form of two sides of a triangle and wherein said tabs having a bending axis along the third triangle side.

4. A brake lining according to claim 1 wherein said cuts are formed in the shape of three sides of a rectangle, and wherein said tab having a bending axis along the fourth rectangle side.

5. A brake lining according to claim 1 wherein said cuts are formed in the shape of two parallel lines joined at one end by a circular line, and said tab having a bending axis along a line connecting the other end of said parallel lines.

6. A brake lining according to claim 1 wherein the angle formed between said tabs and said backing plate is nearly 90 degrees.

7. A brake lining according to claim 1 wherein the angle formed between said tab and said backing plate is nearly 45 degrees.

* * * * *